United States Patent [19]

Matsushita

[11] Patent Number: 5,349,693
[45] Date of Patent: Sep. 20, 1994

[54] CONTROL CIRCUIT FOR DIGITAL DATA TRANSFER

[75] Inventor: Naoyuki Matsushita, Tokyo, Japan

[73] Assignee: NEC Corporation, Tokyo, Japan

[21] Appl. No.: 158,188

[22] Filed: Nov. 23, 1993

Related U.S. Application Data

[63] Continuation of Ser. No. 557,033, Jul. 23, 1990, abandoned.

[30] Foreign Application Priority Data

Jul. 21, 1989 [JP] Japan .................. 1-187286

[51] Int. Cl.⁵ .......................... G06F 3/00; G06F 13/36
[52] U.S. Cl. ........................ 395/800; 395/200;
395/250; 364/238.1; 364/238.2; 364/238.3;
364/238.4; 364/240.5; 364/240.7; 364/DIG. 1;
364/DIG. 2
[58] Field of Search ...................... 395/800, 200, 250;
364/238.1, 238.2, 238.3, 238.4, 240.5, 240.7,
DIG. 1, DIG. 2

[56] References Cited

U.S. PATENT DOCUMENTS

| | | | |
|---|---|---|---|
| 4,137,562 | 1/1979 | Boeck et al. | 395/425 |
| 4,467,447 | 8/1984 | Takahashi et al. | 395/250 |
| 4,516,199 | 5/1985 | Frieder et al. | 395/275 |
| 4,663,706 | 5/1987 | Allen et al. | 395/200 |
| 4,750,107 | 6/1988 | Buggert | 395/275 |
| 4,878,166 | 10/1989 | Johnson et al. | 395/425 |
| 4,933,846 | 6/1990 | Humphrey et al. | 395/325 |

*Primary Examiner*—Alyssa H. Bowler
*Assistant Examiner*—Dlung C. Nguyen

[57] ABSTRACT

A control circuit for digital data transfer between two digital circuits provided with two different bus architectures. The circuit includes two data bus transceivers which are controlled in a manner which determines data transfer between two CPU packages which are rendered compatible. The data bus transceivers are further controlled such that only one data bus transceiver is selectively rendered operative. The two data bus transceivers are respectively assigned to two memory units. One of the memory units is made active in the event that the data bus transceiver assigned thereto is rendered operative, while the other memory unit is made active in the event that the other data bus transceiver assigned thereto is rendered operative.

4 Claims, 6 Drawing Sheets

| | STATE OF CPU 11 | OPERATION MODE OF CPU 11 OR EXT CPU | HOLD ACK SIGNAL 71 | WRITE SIGNAL 82 | RAM WRITE SIGNAL 86 |
|---|---|---|---|---|---|
| A | ACTIVE | WRITE | H | L | L (= WRITE SIGNAL 82) |
| B | ACTIVE | READ | H | H | H (= WRITE SIGNAL 82) |
| C | HOLD | WRITE | L | - | L (= WRITE SIGNAL 85) |
| D | HOLD | READ | L | - | H (= WRITE SIGNAL 85) |

FIG.3

| | ACCESS UNIT | ADDRESS TO BE ACCESSED | UPPER BYTE ENABLE SIGNAL 83 | A0 | A0N | HOLD ACK SIGNAL 71 | CHIP SELECT SIGNAL 72 | CHIP SELECT SIGNAL 87 | CHIP SELECT SIGNAL 88 |
|---|---|---|---|---|---|---|---|---|---|
| A | WORD | EVEN | L | L | H | H | L | L | L |
| B | WORD | ODD (1)<br>(2) | L<br>H | H<br>L | L<br>H | H<br>H | L<br>L | H<br>L | L<br>H |
| C | BYTE | EVEN | H | L | H | H | L | L | H |
| D | BYTE | ODD | L | H | L | H | L | H | L |

FIG.4

| | DATA TRANSFER DIRECTION | BITS SELECTED | A0 | A0N | HOLD ACK SIGNAL 71 | READ SIGNAL 81 | ADDRESS OF EXTERNAL PACKAGE |
|---|---|---|---|---|---|---|---|
| A | A → B | LOWER 8 BITS | L | H | H | H | EVEN |
| B | A → B | UPPER 8 BITS | H | L | H | H | ODD |
| C | A B | LOWER 8 BITS | L | H | L | – | EVEN |
| D | A B | UPPER 8 BITS | H | L | L | – | ODD |

CONTROL CIRCUIT FOR DIGITAL DATA TRANSFER

This is a continuation of application Ser. No. 557,033, filed Jul. 23, 1990 now abandoned.

BACKGROUND OF THE INVENTION

1. Field of the Invention

The present invention relates to an arrangement of controlling digital data transfer between digital circuit packages or the like having different bus architectures. More specifically, the present invention relates to such an arrangement by which different architecture packages are able to implement data exchange without any changes of the bus architectures thereof.

2. Description of the Prior Art

In a microcomputer system, it is often the case that a central processing unit (CPU) originally installed is required to be replaced with a more effective CPU having a wider data bus. By way of example, an 8-bit data bus type CPU is required to be replaced with a CPU having 16-bit data bus. In such a case, a package including a new 16-bit CPU is no longer compatible with circuitry installed in the package itself and also incompatible with external packages.

In order to adapt the new CPU to the requirements of the circuits within the CPU package and also render the CPU package compatible with external packages, the following approaches have been proposed.

A first conventional approach is to select a CPU which has wider internal buses (16-bit for example) and external buses each equal to an original narrow bus (8-bit for example). Accordingly, the CPU newly installed becomes compatible with blocks coupled to the CPU. However, data transfer between the new CPU and storage means such as read-only-memories (ROMs) and/or random-access-memories (RAMs) within the same CPU package are implemented by way of the previous narrow buses, and hence an overall processing speed can be raised merely by increase in a new CPU clock speed.

Another conventional approach to solving the above-mentioned difficulties is that the least significant bit line A0 of a newly installed CPU is rendered inoperative and hence data transfer with external packages are performed using every other address (practically even addresses). It follows that this prior art has a disadvantage that only one half of the address area of an external package can be accessed.

SUMMARY OF THE INVENTION

It is an object of the present invention to provide an improved arrangement by which two different bus architecture CPU packages are rendered compatible.

In brief, the above objects are achieved by a provision of two data bus transceivers which are controlled in a manner which determines data transfer between the two CPU packages, and which are further controlled such that only one data bus transceiver is selectively rendered operative. The two data bus transceivers are respectively assigned to two memory means. One of the memory means is made active in the event that the data bus transceiver assigned thereto is rendered operative, while the other memory means is made active in the event that the other data bus transceiver assigned thereto is rendered operative.

More specifically a first aspect of the present invention comes in a digital circuit assembly including a central processing unit, said digital circuit assembly receiving data from an external digital circuit assembly and transmitting data thereto, said digital circuit assembly comprising: a first data bus transceiver being operatively coupled to said external digital circuit assembly; a second data bus transceiver being operatively coupled to said external digital circuit assembly; first memory means which is allocated to said first data bus transceiver; second memory means which is allocated to said second data bus transceiver; first control means operatively coupled to said first and second data bus transceivers, said first control means controlling said first and second data bus transceivers in a manner which determines data transfer direction between said digital circuit assembly and said external digital circuit assembly, and said first control means selectively rendering one of said first and second data bus transceivers operative; and second control means for allowing said first memory means to be active in the event that said first control means renders said first data bus transceiver operative, and said second control means allowing said second memory means to be active in the event that said first control means renders said second data bus transceiver operative.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be discussed with reference to the accompanying drawings.

Figure 1A:
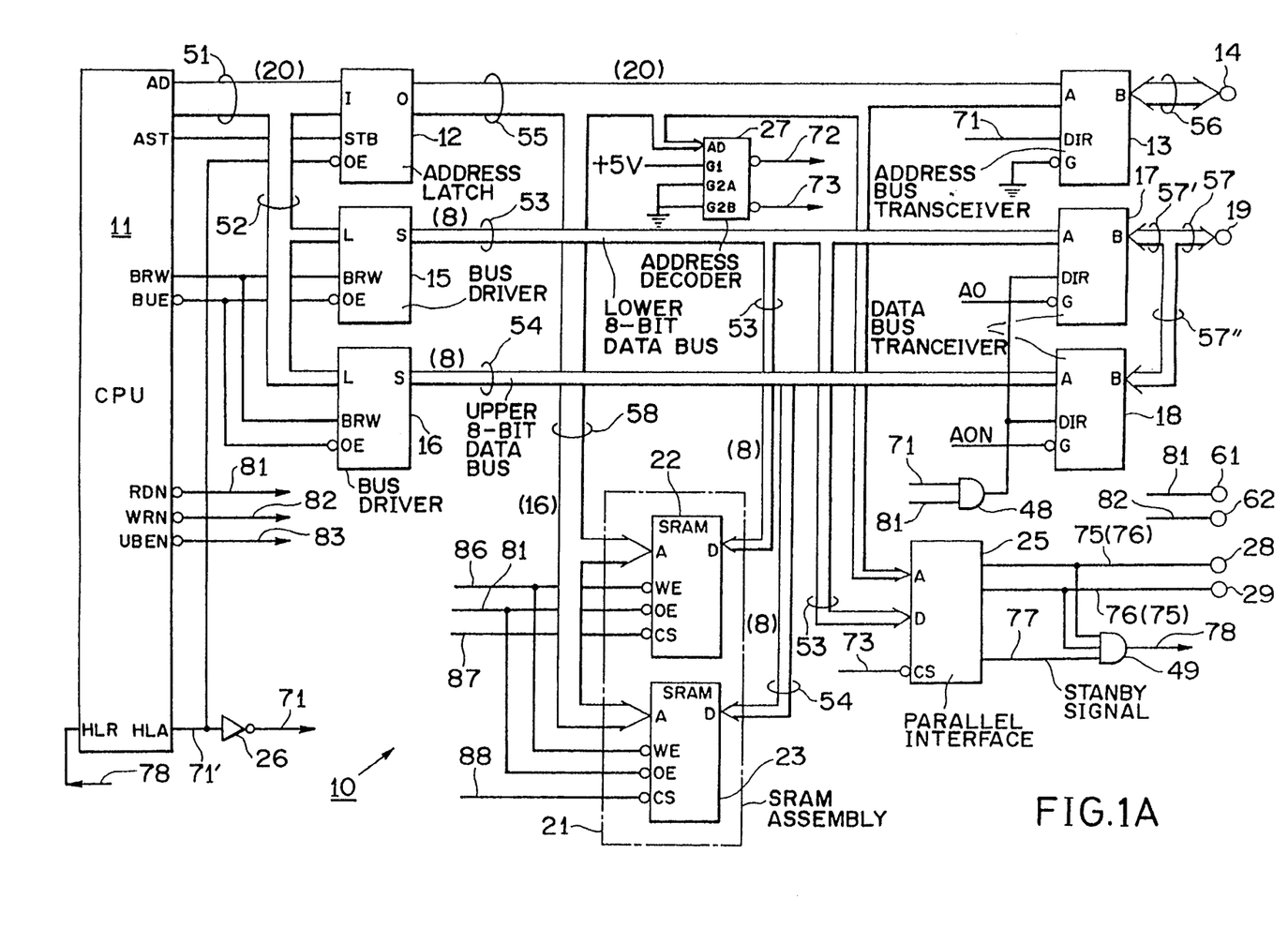
FIG. 1A is a block diagram showing a preferred embodiment of the present invention.
Figure 1B:
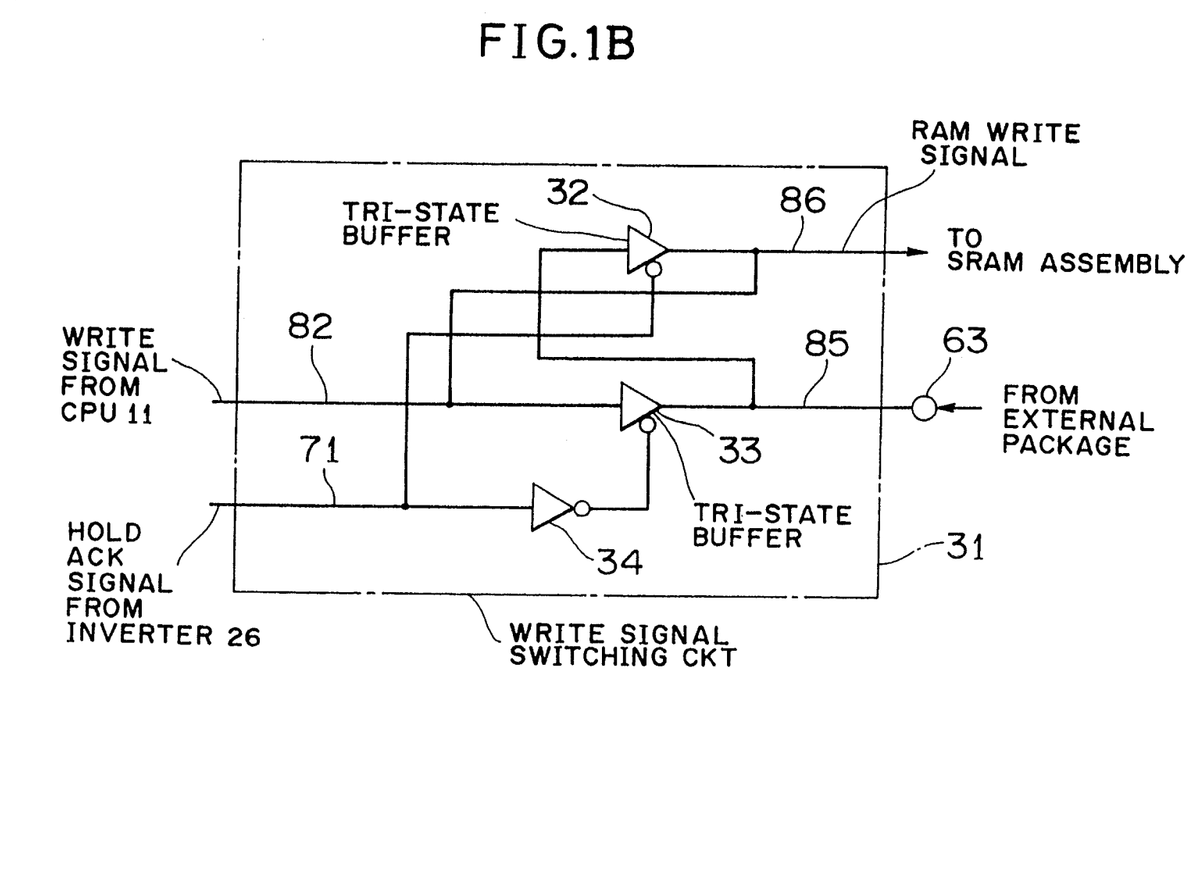
FIG. 1B is a block diagram which is operatively coupled to the FIG. 1A arrangement.
Figure 1C:
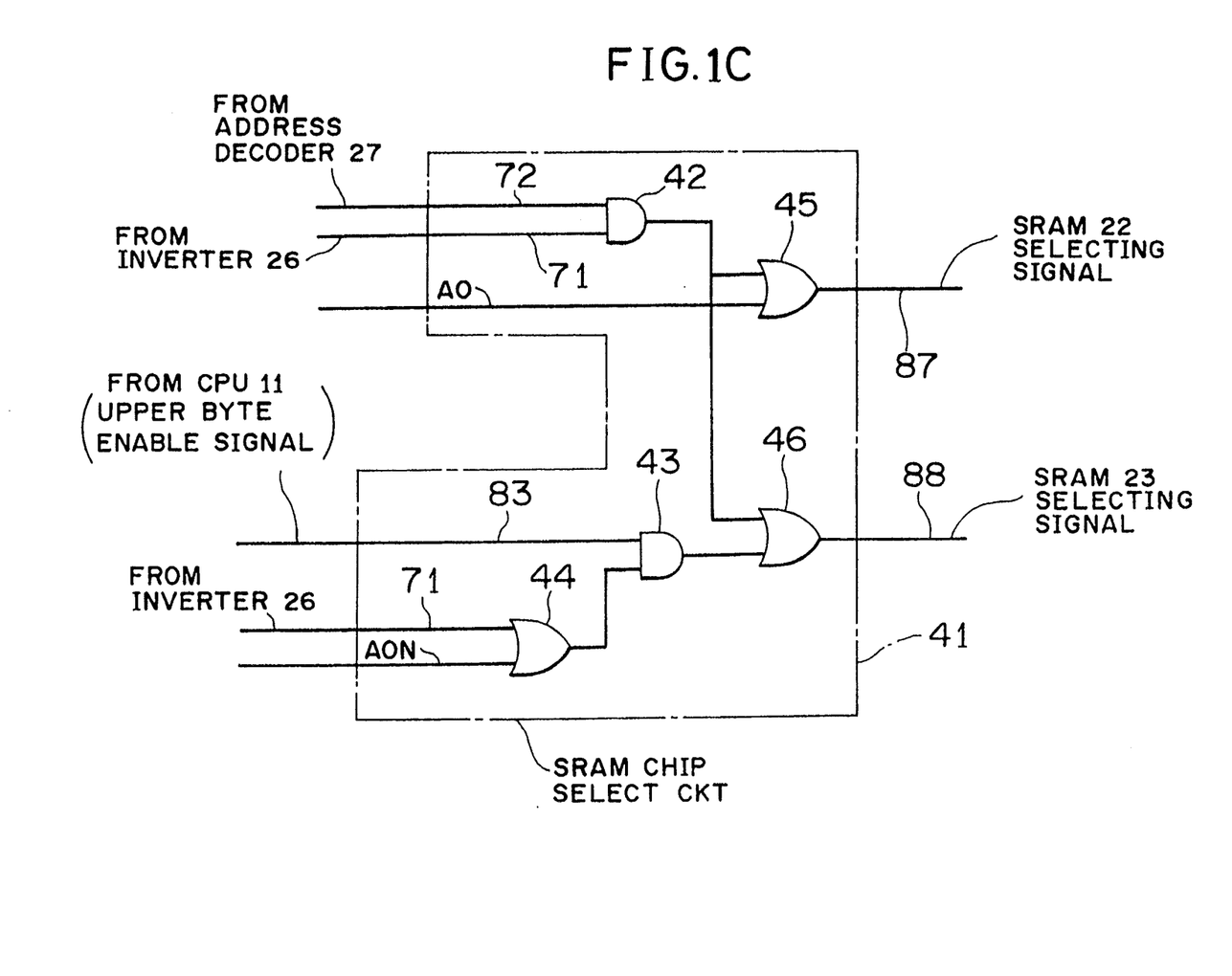
FIG. 1C is a block diagram which is operatively coupled to the FIG. 1A arrangement.

Before referring to the operation of the arrangements of FIGS. 1A, 1B and 1C, it is deemed advantageous to first describe the constructional features thereof. In FIG. 1A, each of the parenthesized numbers positioned in the vicinity of buses indicates the number of signal lines of the corresponding bus.

Let it be assumed that the CPU 11 was initially of 8-bit data bus type and has been changed to 16-bit data bus type. It is further assumed that: (a) an external CPU package (not shown) is operatively coupled to the CPU package 10 and (b) a CPU within the external package is still of 8-bit data bus type.

The CPU package 10 is comprised of the arrangement shown in FIG. 1A plus those shown in FIGS. 1B and 1C.

An address/data bus 51, including 20 information lines, is coupled between AD (Address/Data terminal) of a CPU 11 and an input terminal I of an address latch circuit 12. A bus 55 includes lower 16-bit lines A0–A15 which extend from the address latch 12 to a terminal A of an address bus transceiver 13. On the other hand, the upper 3-bit lines A17–A19 of the bus 55 are coupled to an address terminal AD of an address decoder 27. Further, two address lines A1 and A2 of the bus 55 are coupled to a parallel interface 25. Each of the least significant bit A0 and the inverted bit thereof A0N are used as a control bit.

It should be noted that in FIG. 1A, terminals marked with circles each represents a terminal of the CPU package 10 for connection with an external package(s).

The output terminal B of the bus transceiver 13 is coupled through a bidirectional bus 56 to an output terminal 14 of the CPU package 10. The data transfer direction of the bus 56 is determined by a hold-acknowledge signal 71 applied to a direction terminal DIR. The hold-acknowledge signal 71 is outputted from a hold-acknowledge signal output terminal HLA of the CPU 11 via an invertor 26. As shown, a gate terminal G of the address bus transceiver 13 is grounded.

The address decoder 27 has a terminal G1 coupled to a predetermined direct voltage source (+5 for example), and further has terminals G2A and G2B each of which is grounded. The address decoder 27 is arranged to decode the address signals A17–A19 and output first and second chip select signals 72, 73.

The 16 lines AD0–AD15 of the bus 51 are utilized as 1B both address and data lines, and are branched off therefrom and are arranged to extend in the form of a 16-bit data bus 52 to bus drivers 15, 16. The 16-bit data bus 52 is further split into lower 8-bit data lines AD-0–AD7 and upper 8-bit data lines AD8–AD15. The lines AD0–AD7 are coupled to a terminal L of the bus driver 15, while the lines AD8–AD15 are coupled to a terminal L of the other bus driver 16. The bus driver 15 has a terminal S coupled to a terminal A of a data bus transceiver 17 through an 8-bit lower data bus 53. Similarly, the data bus driver 16 has a terminal S coupled to a terminal A of a bus transceiver 18 by way of an upper 8-bit data bus 54. The data bus transceivers 17, 18 have corresponding terminals B to which 8-bit data buses 57' and 57" extend respectively. The 8-bit data buses 57' and 57" are combined and formed into a 8-bit data bus 57 which is coupled to a CPU package terminal denoted by the numeral 19. The buses 57, 57' and 57" exhibit bidirectional data transfer functions. The data transfer direction of each of these buses 57, 57' and 57" is controlled by a signal which is applied from an AND gate 48 to direction terminals (DIR) of the bus transceivers 17 and 18. The AND gate 48 is supplied with the signals 71 and 81 from the inverter 26 and the CPU 11, respectively. Further, the bus transceiver 17 is gated by signal A0, while the bus transceiver 18 is gated by a signal A0N.

As shown, a bus 58, which includes the address lines AD1–AD16 of the bus 55, is coupled to two static random-access-memories (SRAM) 22, 23 by way of corresponding address terminals each of which is denoted by A. The SRAMs 22, 23 form in combination a SRAM assembly 21. On the other hand, the lower 8-bit data bus 53 is coupled to the SRAM 22 through a data terminal D. Similarly, the upper 8-bit data bus 54 is coupled to the SRAM 23 through a data terminal D. Each of the SRAMs 22, 23 has a memory capacity of 32K bytes merely by way of example.

It should be noted that data located by even addresses are written into and read out of the SRAM 22, while data identified by odd addresses are written into and read of the SRAM 23.

The parallel interface 25 is coupled through a data terminal D to the lower 8-bit data bus 53, and also coupled through an address terminal A to two address lines A1 and A2 of the bus 55. The CPU 11 implements data input/output against a port address determined by the parallel interface 25. That is to say, the port address is identified by the addresses on the lines A1, A2 and a chip select signal 73 (applied to a terminal CS). More specifically, when handshaking is required between the CPU package 10 and an external package, the parallel interface 25 outputs a call signal 75 through a package terminal 28 and receives an acknowledge signal 76 through another package terminal 29. Further, the parallel interface 25 outputs a standby signal 77. An AND gate 49 receives all three signals 75, 76 and 77, and outputs a CPU-hold requiring signal 78 which assumes a logic level determined by the inputted three signals.

The address latch circuit 12 has a strobe terminal STB and an output enable terminal OE, which are respectively coupled to an address set terminal AST and the hold-acknowledge terminal HLA, both of the CPU 11. The circuit 12 latches addresses, applied from the CPU 11, under the control of the signals fed to the above-mentioned terminals STB and OE.

The CPU 11 has a bus direction control terminal BRW which is coupled to corresponding BRWs of the bus drivers 15, 16, and has a buffer enable terminal BUE coupled to an output enable terminal OE of each of the bus drivers 15, 16. The transfer direction of data on the buses 53, 54 are controlled by signals applied to the terminals BRW and OE of the bus drivers 15, 16.

The CPU 11 is further provided with a read terminal RDN, a write terminal WRN and an upper byte enable terminal UBEN, which respectively generate a read signal 81, a write signal 82 and an upper byte enable signal 83. It should be noted that the last character "N" of each of the terminals RDN, WRN and UBEN implies that the corresponding signal assumes a inverted logic level as compared with the signals outputted from the terminals denoted by characters without "N".

The CPU 11 is supplied with a hold request signal 78 at a terminal HLR and outputs a signal 71' from the terminal HLA in response to the signal 78. The signal 71' is inverted at the invertor 26 whose output is the hold-acknowledge signal 71. As will be appreciated later, the signals 81, 82, 83 and 71 are used to control the data bus transceivers 17, 18 and the SRAM assembly 21. The read signal 81 and the write signal 82, are also applied to an external package(s) through terminals 61 and 62, respectively.

Referring now to FIG. 1B, wherein a write signal switching circuit 31 is illustrated in block diagram form. As illustrated, the circuit 31 includes two tristate buffers 32, 33 and an invertor 34. The switching circuit 31 selects one of two write signals 82, 85 (viz., selectively switches therebetween) in response to the hold-acknowledge signal 71, and outputs a RAM write signal 86. The write signal 82 is generated from the CPU 11 as mentioned above, while the write signal 85 is applied via a package terminal 63 to the switching circuit 31 from an external package.

FIG. 1C shows a detailed arrangement of a chip select circuit 41, which is comprised of two AND gates 42, 43 and three OR gates 44, 45 and 46. The circuit 41 receives the signals 71, 72, 83, A0 and A0N, and selectively generates a SRAM 22 selecting signal 87 and a SRAM 23 selecting signal 88.

As shown in FIG. 1A, the SRAM assembly 21 is supplied with the RAM read signal 81, the RAM write signal 86, the chip selecting signals 87 and 88. These signals control read/write operations in connection with the SRAM chips 22, 23, as will be discussed in more detail.

The operation of the CPU package 10 illustrated in FIGS. 1A, 1B and 1C, will be described with reference to FIGS. 2 through 4, each of which is a table showing logic levels of signals appearing in the arrangement, etc.

As mentioned previously, it is assumed that the CPU 11 was initially of 8-bit data bus type and has been changed to 16-bit data bus type. It is further assumed that: (a) an external CPU package (not shown) is operatively coupled to the CPU package 10 and (b) a CPU within the external package is still of 8-bit data bus type.

The 16-bit lines AD0–AD16 of the bus 51 are used in common by address and data signals in a time-shared manner, and hence information on the bit lines AD-0–AD16 should be latched by a latch 12 until required.

In order to latch an address signal applied from the CPU 11 and appearing on the bus 51, the CPU 11 applies an address latch signal from the terminal AST to the strobe terminal STB of the latch 12. In this case, since the CPU 11 is in an active state (viz., not in a hold state), the CPU 11 applies the hold-acknowledge signal 71' from the terminal HLA to the output enable terminal OE of the latch 12. In this particular case, the hold-acknowledge signal 71' assumes a low level (denoted by L). Accordingly, the address information held in the latch 12 is outputted onto the bus 55.

In the first place, descriptions will be made in connection with the case where the CPU 11 writes data into the SRAM assembly 21 within the same CPU package 10. In this case, the CPU 11 is in an active state thereof and outputs an address signal on the bus 52. Further, the write signal 82 takes a low level (L), while the read signal 81 assumes a high level (H).

Figure 2:
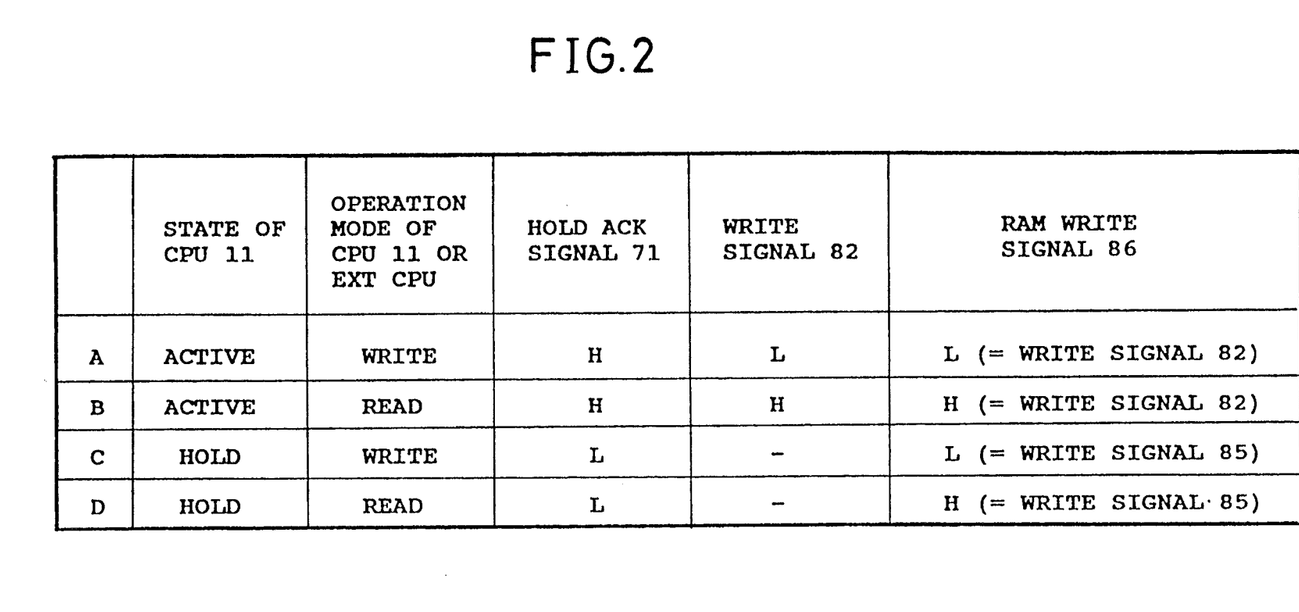
FIG. 2, FIG. 3 and FIG. 4 each is a table showing a logic level of each of signals appearing in the arrangements of FIGS. 1A, 1B and 1C and the state of a CPU, etc.

FIG. 2 is a table showing the logic level of each of the signals 71, 82 and 86 which are applied to and derived from the write signal switching circuit 31 (FIG. 1B) together with the states of the CPU 11 and an external CPU (not shown).

As will be understood from of "LINE A" of FIG. 2, the CPU 11 is active in the case where the CPU 11 writes data into the SRAM assembly 21, as referred to above. Further, the hold acknowledge signal 71 assumes a high level (H), while the write signal 82 assumes a low level (L). It is understood therefore that the RAM write signal 86 is equal to the write signal 82 and assumes a low level (L). Thus, the read signal 81 (H) and the write signal 86 (L) are applied to the SRAMs 22 and 23. Which of the two SRAMs 22 and 23 is to be selected, is determined by the chip select signals 87 and 88.

Figure 3:
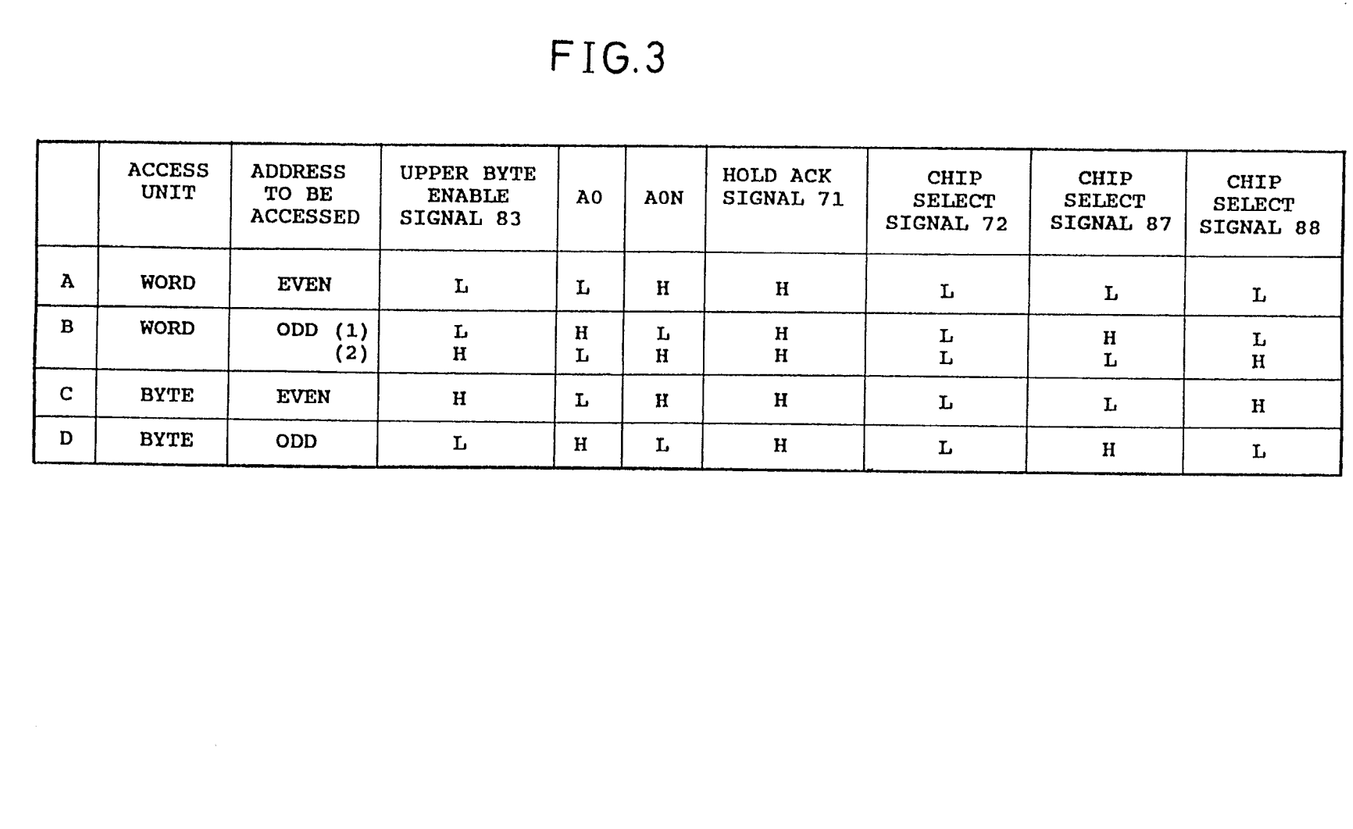
Figure 4:
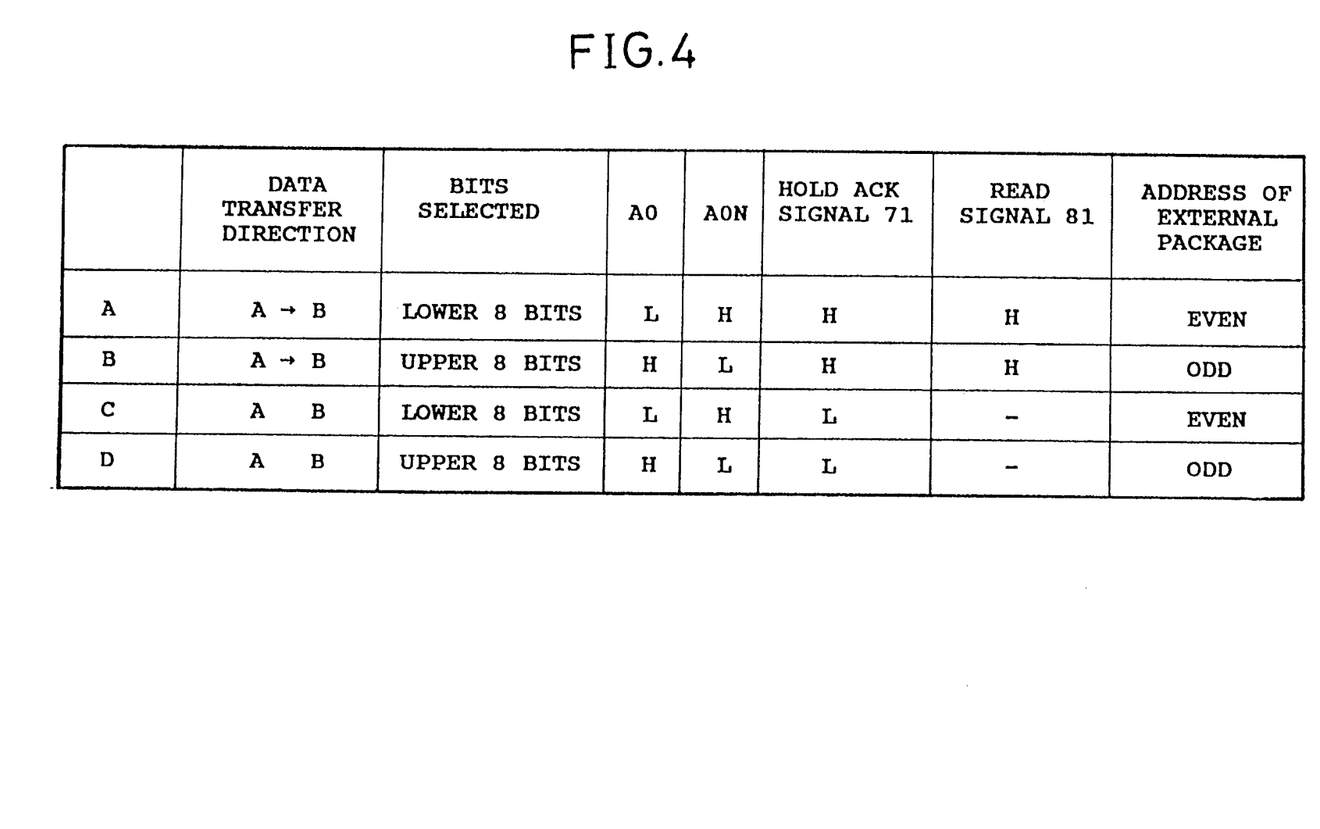

The above discussion, related to the case indicated by "LINE A" of FIG. 2, will further be made with reference to FIG. 3.

FIG. 3 is a table which shows the logic level of each of the signal A0, A0N, 71, 83, 87 and 88 in relation to the chip select circuit 41. The chip select signals 87 and 88 can be specified by the logic states of the signals A0, A0N and 83. It should be noted that the CPU 11 accesses a given address on a byte (8-bit) basis or a word (16-bit) basis. In the case where an access of the CPU 11 to the SRAM assembly 21 is made by even addresses in terms of a byte ("LINE C" of FIG. 3), the upper byte enable signal 83 assumes a high level (H) while the least significant bit A0 a low level (L). In this particular case, the bit A0N assumes a high level (H) and hence the chip select signals 87 and 88 assumes low and high levels respectively. This means that the SRAM 22, provided for storing data located by even addresses, is selected. Consequently, the CPU 11 writes data into the SRAM 22 using even addresses ("LINE C" of FIG. 3).

Similarly, in the case where a byte access to the SRAM assembly 21 by the CPU 11 is made by way of odd addresses, the SRAM chip 23 is selected ("LINE D" of FIG. 3). Further, in the case of a word access to the SRAM assembly 21 by the CPU 11 using even addresses, both of the SRAM chips 22 and 23 are selected ("LINE A" of FIG. 3). On the other hand, when the CPU 11 makes an access to the SRAM assembly 21 by odd addresses, this operation requires two bus cycles. That is to say, the SRAM 23 is initially selected during a given bus cycle for storing data located by an odd address, after which the SRAM 22 is selected during the subsequent bus cycle for memorizing data specified by an even address. Thus, the CPU 11 writes data into predetermined memory portions of the SRAM assembly 21, which are specified by even and odd addresses ("LINE B" of FIG. 3).

Contrary to the above, when the CPU 11 reads data out of the SRAM assembly 21, the read signal 81 assumes a low level (active) and is applied to the output enable terminal OE of the SRAMs 22 and 23. The write signal 82 assumes a high level (inactive) and hence the RAM write signal 86 is rendered inactive (assumes a high level). It is deemed unnecessary to further describe the readout operations by the CPU 11 in that it can readily be understood from the above-mentioned write operations.

Data transfer between the CPU package 10 and an external CPU package (not shown) will be discussed in detail. It should be noted that the inter-package data transmission is directly concerned with the instant invention.

Again, it is assumed that the CPU 11 was initially of 8-bit data bus type and has been changed to 16-bit data bus type. It is further assumed that: (a) an external CPU package is operatively coupled to the CPU package 10 and (b) a CPU within the external package is still of 8-bit data bus type.

An access to the external CPU package by the CPU 11 will first be described.

In this instance, the CPU 11 brings a CPU of the external package to be held or rendered inoperative, after which the CPU 11 gains a right of use of buses within the external package. Address information, which has been latched by the latch 12, appears on the 20-bit bus 55. 16 bits (A0–A15) are applied to the address bus transceiver 13, while two bits (A1–A2) to the parallel interface 25. The second chip select signal 73, outputted from the address decoder 27, takes a low level (active), thereby selecting the parallel interface 25. Thus, the parallel interface 25 applies the call signal 75 to the external package via the terminal 28, which is selected by the two bits A1 and A2. If the CPU package receives an acknowledge signal from the external package (at the terminal 29), the CPU 11 is ready to transfer data from the CPU package 10 to the external package. In this instance, the address bus transceiver 13 receives the signal 71 assuming a high level at the terminal DIR, and therefore the address information is transferred from the bus 55 to the bus 56.

On the other hand, lower and upper 8-bit data, appearing on the buses 53 and 54, are respectively applied to the data bus transceivers 17 and 18. As mentioned previously, lower and upper bit data are located by even and odd addresses, respectively. The data transfer directions at the data bus transceivers 17 and 18 are determined by the output of the AND gate 48. Further, the least significant bit A0 and the reversed value thereof A0N, decides respectively whether or not the data bus transceivers 17 and 18 are rendered operative.

The above-mentioned operation will further be discussed with reference to FIG. 4, especially to LINE A and LINE B thereof.

In the case in question, each of the hold-acknowledge signal 71 and the read signal 81 assumes a high level (H). Accordingly, the output of the AND gate 48 assumes a high level (H) and allows each of the transceivers 17 and 18 to transfer data from the terminal A to the terminal B (see "data transfer direction" of FIG. 4). In the event that the bits A0, A0N assume low and high levels respectively, only the data bus transceiver 17 is gated. Consequently, the lower 8-bit data on the bus 53 is transmitted to the external package via the terminal 19. Thus, the lower 8-bit data in the CPU package 10 is stored in a memory position, located by an even address, within the external package ("LINE A" of FIG.4). On the other hand, when the bits A0, A0N assume high and low levels respectively, only the data bus transceiver 18 is in turn gated. As a consequence, the upper 8-bit data on the bus 54 is transmitted to the external package via the terminal 19. It follows that the upper 8-bit data in the CPU package 10 is transferred and stored in a memory position, located by an odd address, within the external package ("LINE" B of FIG. 4). It is understood that if the CPU 11 makes an access to sequential addresses, then the data bus transceivers 17 and 18 are alternately gated or selected.

In the following, an access to the CPU package 10 (FIGS. 1A–1C) by the external CPU package will be discussed.

In this case, the CPU 11 gives a right of use of the buses within the package 10 to the external CPU package and enters into a hold state.

More specifically, the second chip select signal 73 assumes a low level (L) by which the parallel interface 25 is selected. Upon the parallel interface 25 receiving a call signal 75 (assuming a high level) applied via the terminal 29 from the external package, the interface 25 applies an acknowledge signal 76 (assuming a high level) to the external package via the terminal 28. In this instance, if the standby signal 77 assumes a high level, the AND gate 49 outputs a CPU hold-requesting signal 78, which assumes a high level and is applied to the terminal HLR of the CPU 11. Thus, the CPU 11 generates a signal 71' assuming a high level at the terminal HLA and enters into a hold state. Therefore, the external package gains a right of use of the buses within the package 10. The inventer 26 outputs the hold-acknowledge signal 71 which assumes a low level.

Since the hold-acknowledge signal 71 assumes a low level, the write signal 85 applied from the external package is selected as the RAM write signal 86 ("LINE C" of FIG. 2). On the other hand, since the hold-acknowledge signal 71 takes a low level, the address bus transceiver 13 steers or directs address signals appearing on the bus 56 (applied from the external package via the terminal 14) toward the bus 55.

Further, data transferred from the external package via the terminal 19, are applied to the data bus transceivers 17, 18. In this case, since the hold-acknowledge signal 71 assumes a low level, data flow takes a direction from the terminal B to the terminal A at each of the transceivers 17, 18. More specifically, if the least significant bit A0 assumes a low level (viz., the bit A0N assumes a high level), the data bus transceiver 17 is gated or selected ("LINE C" of FIG. 4). Thus, the external package is able to store data, located by even addresses, into the SRAM 22 which is provided for memorizing data identified by even addresses. On the contrary, in the event that the bit A0N assumes a low level, the data bus transceiver 18 is selected. It is understood that the external package is able to memorize data, located by odd addresses, into the SRAM 23.

When the access to the CPU package 10 by the external one is terminated, the parallel interface 25 receives a call signal applied to the terminal 29 from the external package and sends back an acknowledge signal to the external package through the terminal 28. Thereafter, the CPU 11 returns to an original or active state.

Another case where the CPU package 10 reads data within the external package, can be appreciated from the foregoing and hence the descriptions thereof will be omitted for brevity.

While the foregoing description describes one embodiment according to the present invention, the various alternatives and modifications possible without departing from the scope of the present invention, which is limited only by the appended claims, will be apparent to those skilled in the art.

What is claimed is:

1. A control circuit for digital data transfer between first and second digital circuits which are respectively provided with different bus architectures, said first digital circuit having an N-bit data bus, N being a positive even integer, said second digital circuit having an N/2-bit data bus, said control circuit being included in said first digital circuit and comprising:

a first data bus transceiver which is operatively coupled to said second digital circuit and to a first N/2-bit data bus provided in said first digital circuit, said first data bus transceiver being assigned to pass therethrough first N/2-bit data;

a second data bus transceiver operatively coupled to said second digital circuit and to a second N/2-bit data bus provided in said first digital circuit, said second data bus transceiver being assigned to pass therethrough second N/2-bit data;

first memory means for storing said first N/2-bit data applied from said second digital circuit via said first data bus transceiver, said first memory means being coupled to said first data bus transceiver via said first N/2-bit data bus;

second memory means for storing said second N/2-bit data applied from said second digital circuit via said second data bus transceiver, said second memory means being coupled to said second data bus transceiver via said second N/2-bit data bus;

first control means operatively coupled to said first and second data bus transceivers, said first control means controlling said first and second data bus transceivers so as to determine data transfer direction between said first and second digital circuits based on negotiations between said first and second digital circuits on a right of use of the data buses within said first and second digital data circuits, and said first control means selectively rendering one of said first and second data bus transceivers operative;

second control means for allowing said first memory means to be active if said first control means renders said first data bus transceiver operative and if said first control means instructs data to be received, from said second digital circuit, and said second control means allowing said second memory means to be active if said first control means renders said second data bus transceiver operative and if said first control means instructs data to be received from said second digital circuit; and third control means for rendering said N-bit data bus to be used as an address bus in a time sharing manner, said third control means branching said N-bit data bus into said first and second N/2-bit data buses.

2. A control circuit as claimed in claim 1, wherein said first control means applies a least significant bit of said address bus to said first and second data bus transceivers such that said least significant bit selectively renders one of said first and second data bus transceivers operative.

3. A control circuit as claimed in claim 1, wherein said first memory means stores data identified by an even address, wherein said second memory means stores data identified by an odd address, and wherein said second control means uses the least significant bit of said address bus so as to selectively render one of said first and second memory means active.

4. A control circuit as claimed in claim 1, wherein said first data bus transceiver is allocated to data identified by an even address, and wherein said second data bus transceiver is allocated to data identified by an odd address.

* * * * *